US006857390B1

(12) United States Patent
Maendel

(10) Patent No.: US 6,857,390 B1
(45) Date of Patent: Feb. 22, 2005

(54) STRIP DISPENSER REARING HATCHLINGS

(75) Inventor: Andrew Maendel, Starbuck (CA)

(73) Assignee: Starlite Manufacturing inc., Starbuck (CA)

( * ) Notice: Subject to any disclaimer, the term of this patent is extended or adjusted under 35 U.S.C. 154(b) by 0 days.

(21) Appl. No.: 10/673,553

(22) Filed: Sep. 30, 2003

(51) Int. Cl.[7] ................................................ A01K 1/10
(52) U.S. Cl. .................................. 119/51.01; 119/57.91; 119/526; 119/449; 47/56; 111/199
(58) Field of Search ............................. 119/51.01, 57.9, 119/526, 449, 56.2, 52.1; 47/9, 56; 111/199, 900; 405/176

(56) References Cited

U.S. PATENT DOCUMENTS

| 3,751,821 A | * | 8/1973 | Olmo et al. ................... 34/93 |
| 3,903,816 A | * | 9/1975 | Brem .......................... 111/130 |
| 3,905,313 A | * | 9/1975 | Grether ....................... 111/200 |
| 5,526,759 A | | 6/1996 | Cox |
| 6,058,860 A | * | 5/2000 | Kinkead et al. ............... 111/11 |
| 6,286,253 B1 | * | 9/2001 | Decker .......................... 47/56 |
| 6,606,966 B1 | * | 8/2003 | Teachey et al. ............. 119/665 |

FOREIGN PATENT DOCUMENTS

EP         628245 A1 * 12/1994 ............ A01K/5/00

* cited by examiner

Primary Examiner—Robert P. Swiatek
Assistant Examiner—Andrea M. Valenti
(74) Attorney, Agent, or Firm—Adrian D. Battison; Michael R. Williams; Ryan W. dupuis

(57) ABSTRACT

Hatchlings are raised initially on a strip of sheet material which is laid on the floor of a containment pen by a vehicle having a support on the vehicle for receiving a roll of a sheet material and a hopper on the vehicle for receiving a feed material for the hatchlings. The strip is laid from the roll in flat form on the floor and held in place by a thin layer of the feed dispensed through a nozzle of the hopper as the vehicle is moved forwardly with the layer having a constant width substantially across the full width of the strip leaving narrow feed free bands at the side edges.

8 Claims, 3 Drawing Sheets

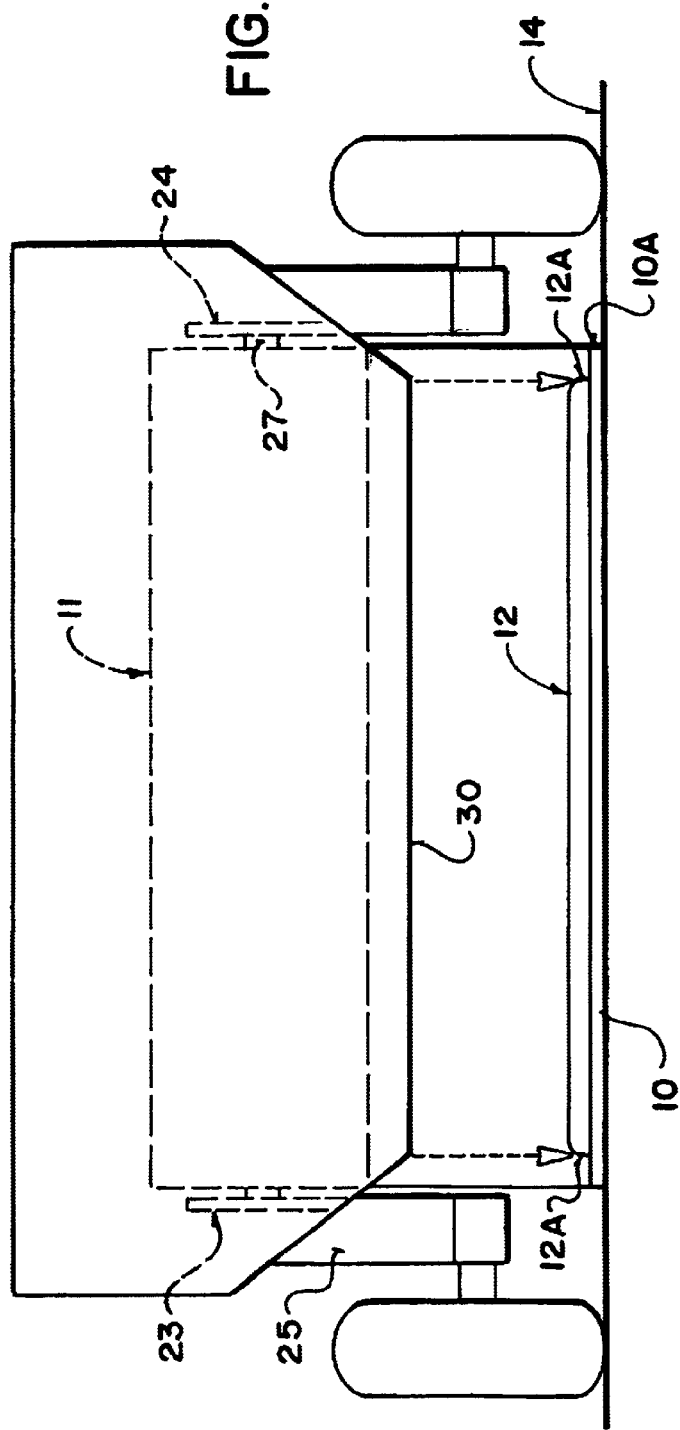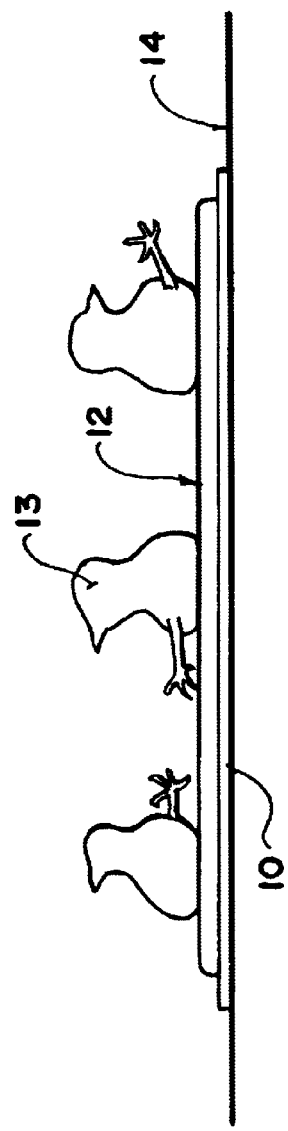

STRIP DISPENSER REARING HATCHLINGS

This invention relates to a strip dispensing apparatus for use in rearing hatchlings in the time period immediately after hatching. The term "hatchlings" used herein is primarily directed to chicks but is also intended to include any hatched birds such as turkeys, geese, ducks which are reared intensively.

BACKGROUND OF THE INVENTION

In U.S. Pat. No. 5,526,759 issued June 18th 1996 by Cox is disclosed an apparatus for laying chick feed support paper. Such paper is used to provide a protective layer on the floor of a containment pen on which the hatchlings are placed when supplied to the pen to grow into larger birds. It is well known that placing the hatchlings or chicks on paper strip with feed immediately accessible to them reduces mortality and encourages growth.

Traditionally such paper strip is laid manually by unrolling from a roll and a strip of feed material is poured or placed on the strip before the chicks are manually carried in to the pen and deposited on the paper with the feed.

Cox provides a trailer arrangement which carries a roll of the paper strip, in which a groove is formed in the material, such as straw or wood shavings, forming the floor surface and the paper is laid into the groove by a rolling wheel which holds the strip in place as it is unrolled from a supply. This device has apparently found little commercial success and is believed not to be available on the market place.

SUMMARY OF THE INVENTION

It is one object of the invention to provide a strip dispensing apparatus for use in rearing hatchlings in the time period immediately after hatching.

According to one aspect of the invention there is provided an apparatus comprising:

a vehicle for movement over a floor of a containment area for raising hatchlings into birds;

a support on the vehicle for receiving a roll of a sheet material such that the roll can dispense the sheet material as a strip laid onto the floor as the vehicle is moved across the floor;

a hopper on the vehicle for receiving a feed material for the hatchlings;

and a dispensing nozzle of the hopper arranged for dispensing a layer of the feed material onto the strip after the strip is laid as the vehicle is moved forwardly.

Preferably the nozzle is elongate extending across the width of the strip of sheet material so as to deposit feed material substantially across the full width.

Preferably the nozzle is arranged relative to the strip such that the nozzle leaves spaces free from the feed at the side edges of the strip.

Preferably the nozzle includes a shut-off valve for closing off feed when the vehicle is halted. The shut-off valve may be formed by a closure plate underneath the nozzle operable by a lever.

Preferably the support for the roll is mounted on the vehicle in front of the hopper.

Preferably the support for the roll is raised from floor. However it may be placed at floor level for direct unrolling of the strip on the floor.

Preferably the vehicle is a trailer which has ground wheels for supporting the hopper with the ground wheels arranged on either side of strip so that the strip can be unrolled through the middle of the wheels.

According to a second aspect of the invention there is provided a method comprising:

providing a vehicle for movement over a floor of a containment area for raising hatchlings into birds;

providing a support on the vehicle for receiving a roll of a sheet material;

dispensing the sheet material as a strip laid onto the floor as the vehicle is moved across the floor;

providing a hopper on the vehicle for receiving a feed material for the hatchlings;

and dispensing the feed through a nozzle of the hopper as a layer of the feed material onto the strip after the strip is laid as the vehicle is moved forwardly such that the strip is held down in place on the floor by the feed from the nozzle.

In an important feature the strip is laid flat on the floor and held in place solely by the feed material laid thereon.

The method allows the feed to be applied in a layer of constant thickness substantially across the full width of the strip leaving a band at each edge of the strip which is free from the feed. This allows the chicks to be placed manually and without difficulty on the feed on the strip allowing even the weakest of the chicks to have access to the feed.

BRIEF DESCRIPTION OF THE DRAWINGS

One embodiment of the invention will now be described in conjunction with the accompanying drawings in which:

FIG. 3 is a rear elevational view of the apparatus of FIG. 1 on an enlarged scale showing the strip laid on the floor and the feed material holding it in place.

FIG. 4 is a rear elevational view showing the strip, feed and chicks on the floor.

In the drawings like characters of reference indicate corresponding parts in the different figures.

DETAILED DESCRIPTION

Figure 1:
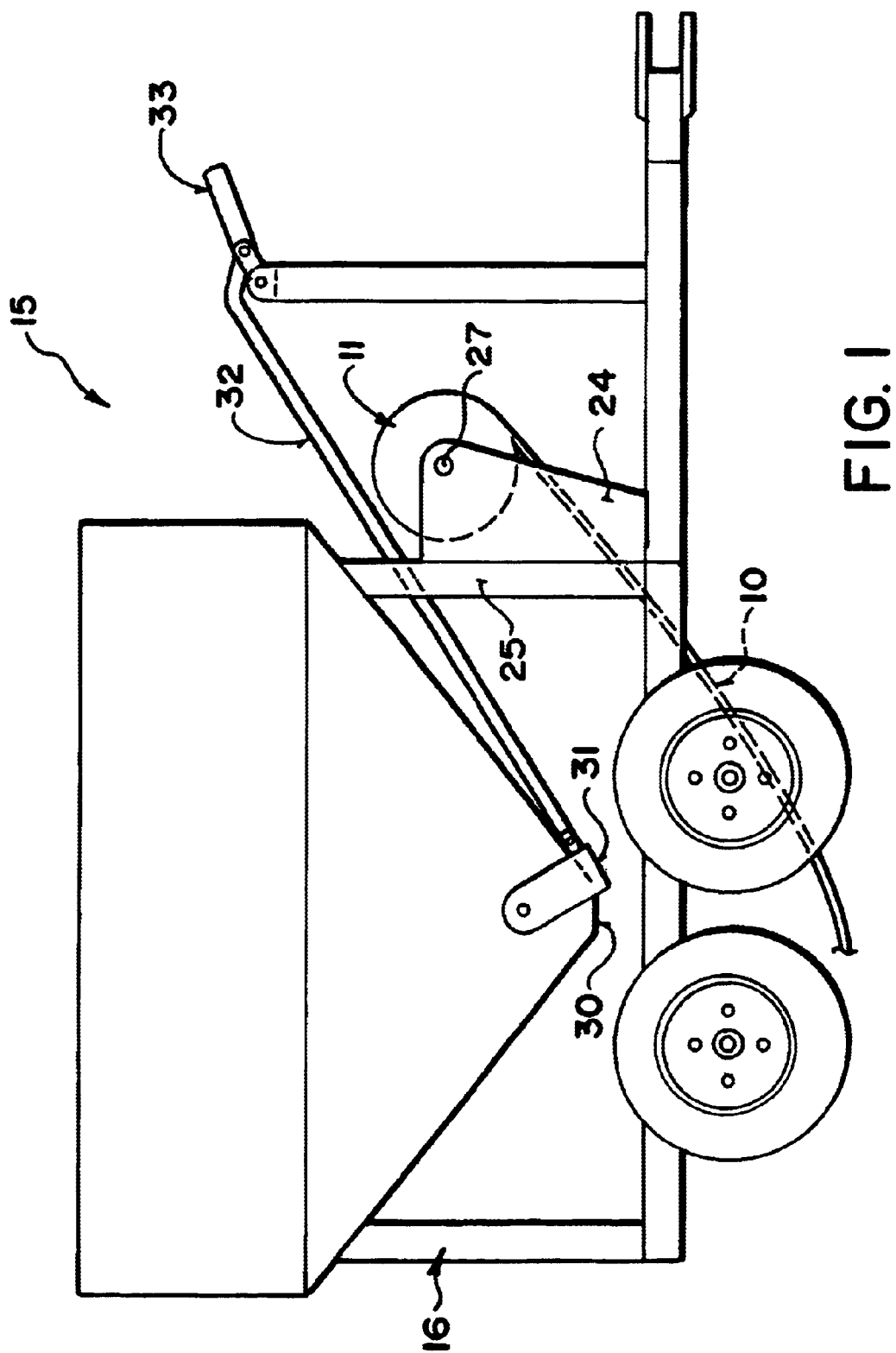
FIG. 1 is a side elevational view of an apparatus according to the present invention for dispensing a paper layer for raising hatchlings.
Figure 2:
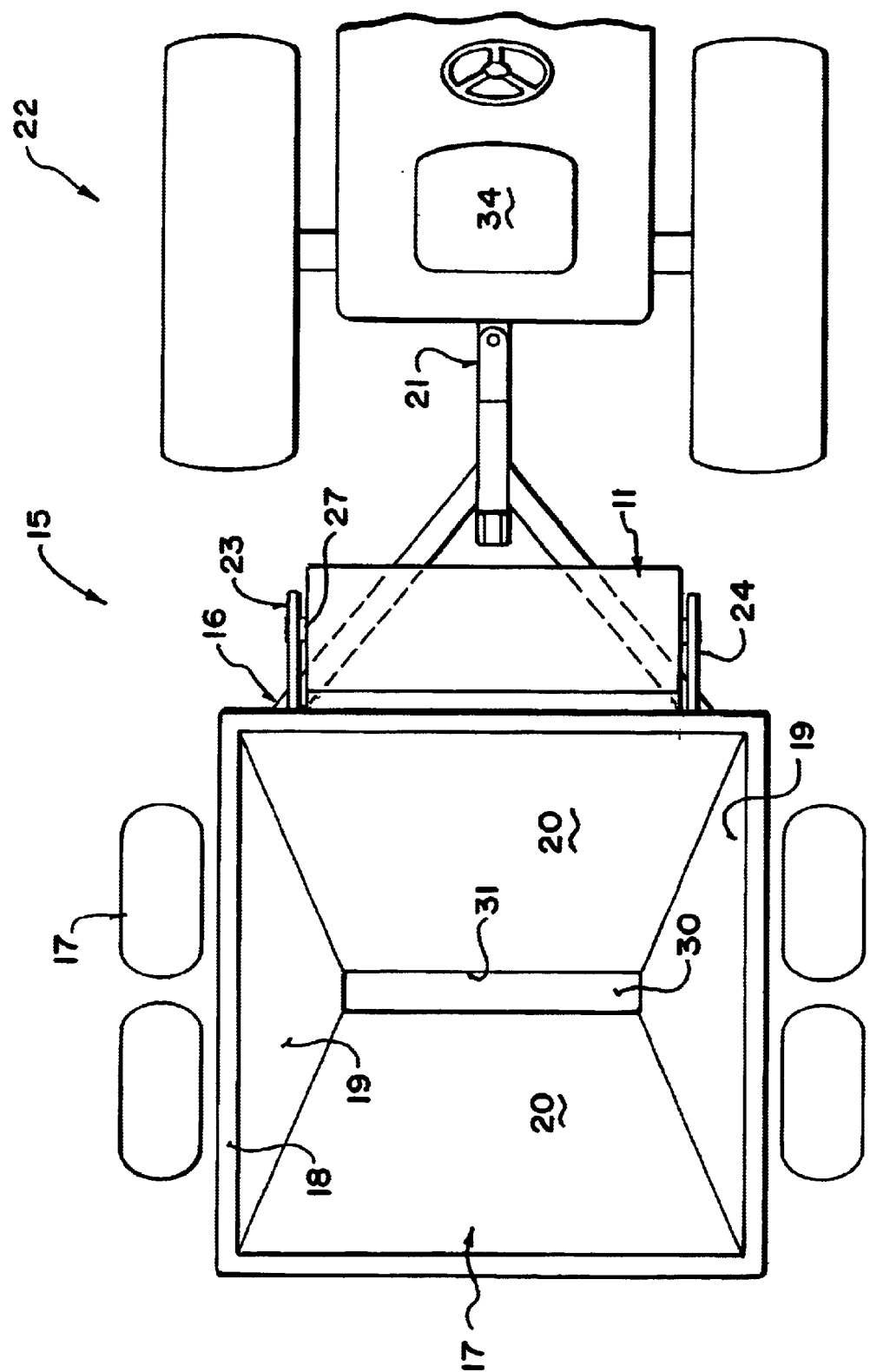
FIG. 2 is a top plan view of the apparatus of FIG. 1.

In the figures is shown an apparatus for laying a strip of sheet material 10 from a roll 11 and for depositing upon the strip 10 a layer 12 of a particulate feed material for hatchlings or chicks 13. The strip 10 is laid flat upon a floor 14 of a containment pen, the floor being formed of suitable materials well known to one killed in the art for raising birds from hatchlings.

The apparatus comprises a trailer 15 including a frame 16 and ground heels 17. The frame 16 includes frame members arranged to support a hopper 17 carried on the frame. The arrangement of the frame members will be well known to one skilled in the art so that detailed description is not required. The hopper 17 includes vertical side walls and inclined hopper bottom walls 19 and 20. The frame provides a hitch 21 at the forward end for attachment to a suitable tractor 22.

The frame 16 carries a pair of forwardly extending support walls 23 and 24 which extend forwardly from the front of the support legs 25 of the hopper. The side wall 23 and 24 are spaced by a width equal to the width of the roll 11 so that the roll is supported between the side walls on a support shaft 27. The roll is thus supported on the front of the hopper between the hopper and the tractor at a position spaced upwardly from the floor. The frame defines frame members which are spaced apart by a width greater than the width of the strip on the roll 11 so that the strip is free to fall downwardly between the frame members and between the wheels to lie upon the floor 14.

The strip is preferably formed of a suitable paper or other sheet material which can be laid over the floor to provide a smooth support surface for receiving the feed and the hatchlings. The sheet material is of a nature which protects the hatchlings from the rough floor and supports the feed so that it is protected against being lost within the floor surface. Thus the hatchlings can be placed upon the paper or other sheet material and supported thereon in a manner which provides immediate access to the feed around them on the paper.

The hopper 17 has the side walls 19 converging inwardly and downwardly to the ends of a bottom nozzle or slot 30 extending across the width of the apparatus. The rolls 20 also converge inwardly and downwardly to define sides 31 of the nozzle.

The width of the nozzle 30 is arranged to be slightly less than the width of the sheet material. Thus as shown in FIG. 3, the layer 12 falls from the nozzle 30 onto the sheet 10 and defines ends 12A of the layer 12 which are spaced inwardly from side edges 10A of the strip material leaving a narrow band of the strip material which is free from the layer.

As the nozzle has a constant width across its full length, the layer that is discharged from the hopper is of a constant thickness, provided that the vehicle is moved across the floor at a constant speed.

Thus the arrangement has the advantage that the layer of feed material is spread evenly across the sheet as close as possible to the edges without risk of losing feed material over the edges so that there are no bare patches on the sheet and no piles of excess feed on the sheet.

The rate of feed through the nozzle can be controlled by a closure plate 31 shown best in FIG. 1 which is operated by a link 32 movable by a lever 33 operable by an operator seated on a seat 34 of the tractor 22. Thus depending upon the flowability of the feed material in particulate form but in the hopper and depending upon the speed of movement across the floor, the operator can move the closure plate 31 to a required position to adjust the width of the slot. The closure plate is located underneath the slot or nozzle 30 so that it can be moved wholly out of the way of the nozzle allowing the full width of the nozzle to discharge the feed material or it can be moved to a position fully closing the nozzle to close off feed when not required or it can be moved to an intermediate position thus adjusting the width of the nozzle 30.

In operation, the operator grasps a portion of the strip material and pulls it underneath the hopper from the roll 11 so that the strip material is located on the floor behind the trailer 15. With the strip material so in place, the operator opens the nozzle 30 by operating the lever 33 to allow an initial portion of feed material onto the strip in the layer 12. Thus the strip is held onto the floor by the weight of the feed material and is properly located on the floor without creases, folding or slippage by the weight of the feed material as the feed material is deposited onto the strip as the vehicle is moved forwardly over the floor.

The strip is thus laid in long lengths along the length of the containment pen with the feed material spread evenly over the strip material for receiving the hatchlings 13.

In conventional manner, hatchlings can be carried manually and deposited carefully onto the feed material. The fact that the feed material is evenly spread allows the hatchlings to be dropped simply onto the paper at any position on the paper strip with the knowledge that the hatchling will be located on feed making it immediately accessible to the hatchling. Even the weakest hatchlings therefore can access feed immediately on becoming aware of their location allowing them to have access to the materials necessary for their growth thus reducing morbidity and loss.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method of raising birds from hatchlings comprising:
   providing a barn defining a containment area having a floor surface arranged for raising birds from the hatchlings;
   providing a vehicle for movement over the floor surface of the containment area;
   providing a support on the vehicle for receiving a roll of a sheet material;
   dispensing the sheet material as a strip laid directly onto the floor surface as the vehicle is moved across the floor;
   providing a hopper on the vehicle for receiving a feed material for the hatchlings;
   dispensing the feed material through a nozzle of the hopper as a layer of the feed material onto the strip after the strip is laid as the vehicle is moved forwardly such that the strip is held down in place on the floor by the feed material from the nozzle;
   causing the feed material to be maintained separated from the floor surface by the sheet material such that the feed material is protected against being lost within the floor surface;
   placing the hatchlings on the strip:
   and protecting by the sheet material the hatchlings from engagement with the floor surface while providing access to the feed material on the sheet material.

2. The method according to claim 1 wherein the nozzle is elongate extending across the width of the strip of sheet material so as to deposit the feed material substantially across the full width.

3. The method according to claim 1 including arranging the nozzle relative to the strip such that the nozzle leaves spaces free from the feed material at the side edges of the strip.

4. The method according to claim 1 including closing off feed through the nozzle when the vehicle is halted.

5. The method according to claim 4 wherein the feed is closed off by a closure plate underneath the nozzle operable by a lever.

6. The method according to claim 4 wherein the vehicle is a trailer towed by a tractor on which the operator rides and wherein the feed is closed off by a lever operable by the operator on the tractor.

7. The method according to claim 1 wherein the strip is laid flat on the floor surface and held in place solely by the feed material laid thereon.

8. The method according to claim 1 wherein the feed material is applied in a layer of constant thickness substantially across the full width of the strip leaving a band at each edge of the strip which is free from the feed material.

* * * * *